United States Patent
Caires et al.

(12) 
(10) Patent No.: US 7,051,753 B1
(45) Date of Patent: May 30, 2006

(54) VALVE FOR A DUNNAGE BAG

(76) Inventors: Mark Joseph Caires, 2560 Donning Ave., San Jose, CA (US) 95128; Helmut Richard Elze, 827 Grosvenor Pl., Oakland, CA (US) 94610; Olaf Dietrich Elze, 284 La Quinta Ct., Walnut Creek, CA (US) 94598

( * ) Notice: Subject to any disclaimer, the term of this patent is extended or adjusted under 35 U.S.C. 154(b) by 239 days.

(21) Appl. No.: 10/744,841

(22) Filed: Dec. 22, 2003

(51) Int. Cl.
    *F16K 15/20* (2006.01)
(52) U.S. Cl. .................................... 137/232
(58) Field of Classification Search ............ 137/223, 137/232, 234.5, 454.5, 541, 542; 410/119; 441/41
    See application file for complete search history.

(56) References Cited

U.S. PATENT DOCUMENTS

| | | | | |
|---|---|---|---|---|
| 2,390,199 A | * | 12/1945 | Walsh | 441/41 |
| 2,627,839 A | * | 2/1953 | Hudgins et al. | 118/505 |
| 3,808,981 A | * | 5/1974 | Shaw | 410/119 |
| 3,995,653 A | * | 12/1976 | Mackal et al. | 137/234 |
| 4,146,070 A | * | 3/1979 | Angarola et al. | 141/68 |
| 4,478,587 A | * | 10/1984 | Mackal | 441/41 |
| 4,579,141 A | * | 4/1986 | Arff | 137/223 |
| 4,633,910 A | * | 1/1987 | Sugimura | 138/30 |
| 4,766,628 A | * | 8/1988 | Walker | 5/706 |
| 4,927,397 A | * | 5/1990 | Yeager | 441/41 |
| 6,089,251 A | * | 7/2000 | Pestel | 137/234.5 |
| 6,929,021 B1 | * | 8/2005 | Cavenagh | 137/223 |

FOREIGN PATENT DOCUMENTS

FR          2627839 A1 *   9/1989

* cited by examiner

*Primary Examiner*—Eric Keasel
*Assistant Examiner*—C Price
(74) *Attorney, Agent, or Firm*—Robert Samuel Smith

(57) ABSTRACT

A valve for an airtight flexible container such as a dunnage bag including a bowl with openings and extending through an opening in the container A flange around the rim of the bowl is heat welded to the container around the opening. One end of a housing is screwed into the rim of the bowl. A cap is removably press fit onto an opposite end of the housing. A spider extending across the housing supports a plug which is spring mounted on the spider and biased to close the lower end of the housing by compressed air in the container. Compressed gas inside the container is released by removing the cap and pressing on the plug to dislodge the plug from its seat on the one end of the housing or by unscrewing and entirely separating the housing from the bowl.

7 Claims, 3 Drawing Sheets

VALVE FOR A DUNNAGE BAG

FIELD OF THE INVENTION

This invention relates to closures for containers and dunnage bags such as are used between pallets to cushion cargo in transit and particularly to a combination plug and cap that enhances dependability of the bag and permits quick deflation.

BACKGROUND AND INFORMATION DISCLOSURE

Common practice to protect cargo stacked on pallets during transit is to position bags filled with moderately compressed air between the rows of pallets. The bags are typically vinyl or reinforced paper.

Because of the large number of bags in use there has been much interest in reducing the cost of the bags and associated equipment and reducing the time and inconvenience required to place and inflate the bags and then deflate and remove the bag after transit is complete. A number of disclosures have appeared to reduce these costs and inconveniences.

For example, U.S. Pat. No. 4,073,389 to Angarola et al discloses a housing engaging a spring loaded plug that permits one way entry of air into the bag. The valve tends to dysfunction and leak with aging of the spring.

U.S. Pat. No. 4,102,364 to Leslie et al discloses a system for rapid pressurizing the air inside the bag from a source of high pressure air.

U.S. Pat. Nos. 4,146,069 and 4,146,070 to Angarola et al discloses another system for rapid filling using a stream of pressurized air to aspirate ambient air into the bag.

U.S. Pat. No. 5,111,838 to Langston discloses a spring loaded valve member movable to open a passage and threaded opening to engage an air hose.

U.S. Pat. No. 5,806,572 discloses an apparatus for inflating a bag to a desired limit.

U.S. Pat. No. 6,053,222 discloses a gun that both inflates the bag when required and accelerates deflation of the bag when required.

None of the several versions of a valve for a dunnage bag described in the cited art prevent leakage especially when the stacks of goods, cushioned by the bags, must remain in storage for a long time. Furthermore, it would be desirable to be able to completely separate the valve from the bag so that, especially if the bag becomes damaged, it would be possible to reuse the valve on another bag.

SUMMARY OF THE INVENTION

It is an object of this invention to provide a valve for an inflatable bag, such as a dunnage bag that is more dependable than valves of the prior art in terms of being less susceptible to leakage.

It is another object t provide a valve that enables the user to control the release of small quantities of gas from the bag when required thereby providing more control of the gas pressure.

It is another object to provide a valve that can be deflated more quickly than valves of the present art.

This invention is directed toward a valve secured on a dunnage bag for controlling flow of gas into and out of the bag. The valve comprises a bowl mounted inside the bag having an outer flange around its rim that is laminated around an opening in the bag. The bowl has openings permitting gas to flow into and out of the bag. A cylindrical housing, open on both ends, has one end screwed Imo the bowl. Another end of the housing extends away from the bag and engages a removable cap. A spring loaded plug, mounted on the inside of the housing, is biased to close the inside end of the housing to prevent gas from escaping through the housing from inside the bag. The spring is mounted on a stem extending vertically from the center of the plug. The stem is slideably mounted on a spider inside the housing. The user permits small amounts of gas to escape by removing the cap and pressing the plug with his finger. When it is required to expel gas quickly from the bag, the housing is unscrewed from the bowl. The cap is preferably tethered to the housing and the housing is preferably tethered to the bowl. The tethers are all one piece so that the parts of the valve are conveniently joined together.

When inflating the bag, the cap is removed and a nozzle is fitted over the (outside) entry end of the housing. Compressed air flows through the nozzle into the housing and forces open the plug. The air enters and passes through openings in the inner bowl and into the bag. After the bag is fully inflated, the compressed air forces the plug to close one end of the housing. The air is further sealed by a cap pressed by the operator onto the entry end of the housing.

DISCUSSION OF A BEST MODE

Figure 1:
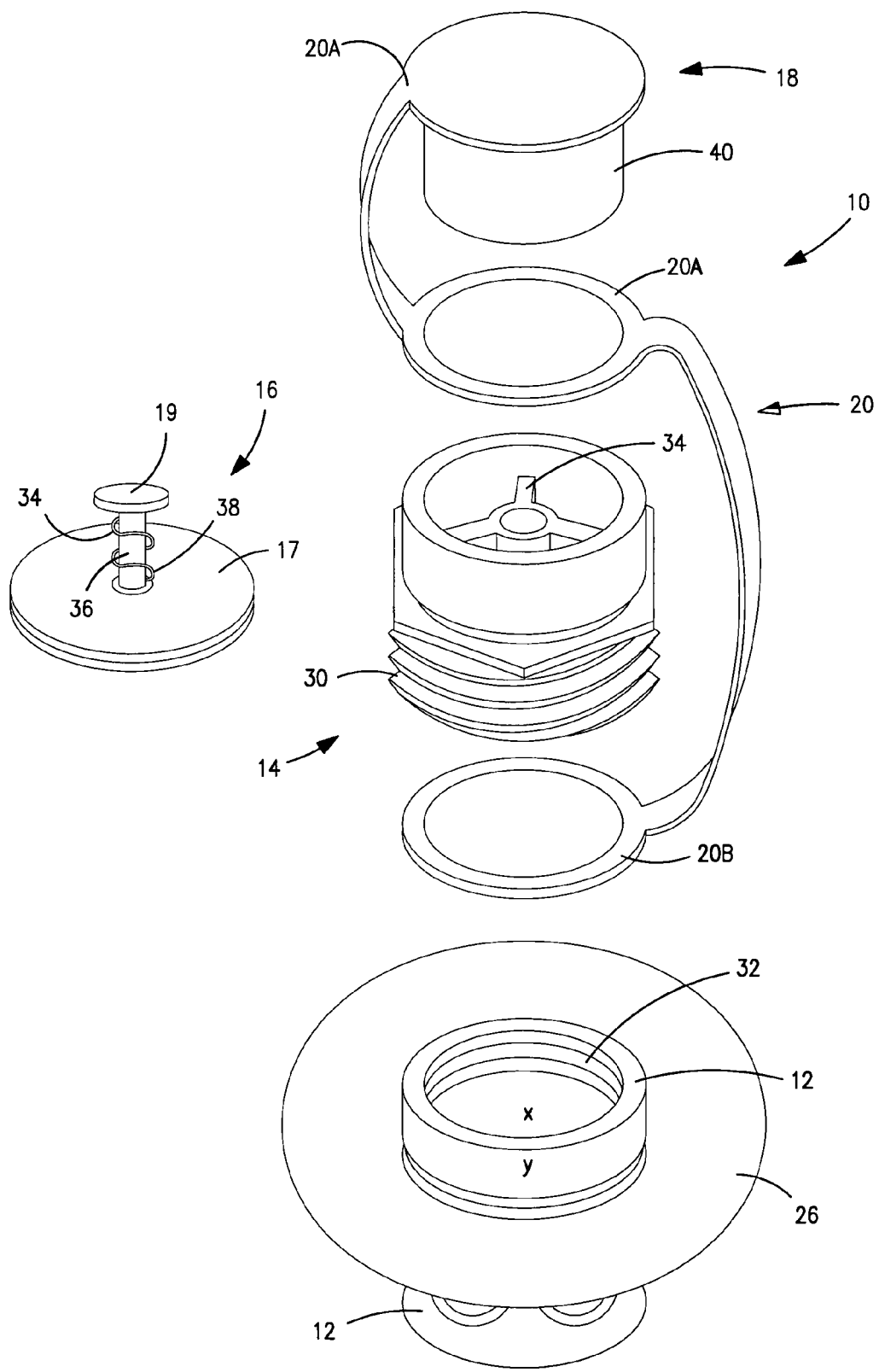
FIG. 1 is a perspective exploded view of the valve of this invention.
Figure 2:
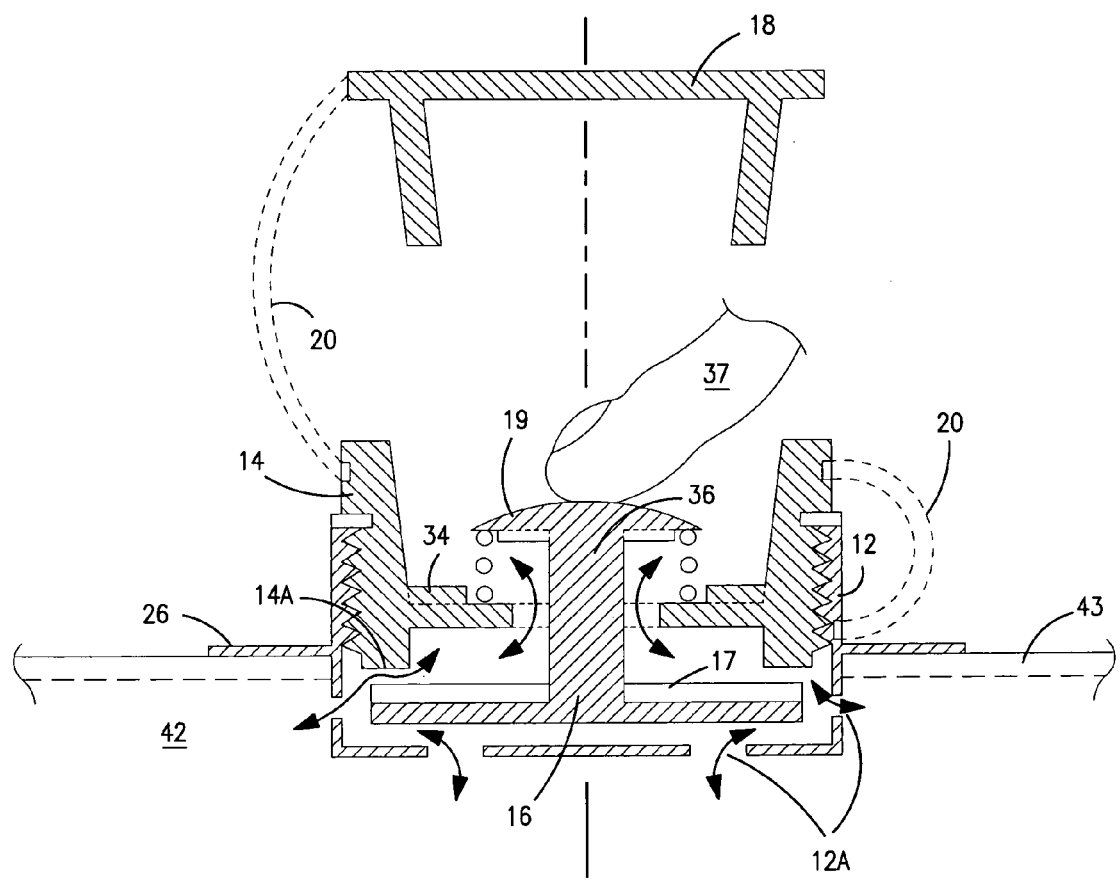
FIG. 2 is a sectional view of the assembled valve.

Turning now to a discussion of the drawings, FIG. 1 is a perspective exploded view of the present invention 10. FIG. 2 is an assembly sectional view of the invention 10. The four separable parts of the valve are a bowl 12, a housing 14, a plug 16, and a cap 18. A tether 20 has one end integrally formed to the cap 18 and a loop 22 that loops around housing 14 and another loop 24 that loops around the open end of bowl 12.

The plug 16 is a disk 17 with a stem 36 extending vertically from its center.

Bowl 12 has a thermoplastic flange 26 that is heat welded to the thermoplastic bag 28 (see FIG. 2.) with the bowl extending through an opening and into the bag.

Housing 14 has a thread 30 on one end that engages an interior thread 32 in the rim of bowl 12.

A spider 34 is secured to the inside surface of the housing. The spider has a central opening that slideably supports the stem 36 of plug 16 so that the disk 17 is axially coincident with the housing inside the housing Spring 38 is contained between stop 19 mounted on the stem 36 and the spider 34 so that the spring 38 biases the disk 17 against the open end 14A of the housing 14.

In order to admit pressurized air in the region 42 inside the bag 43, the cap 40 is removed from the housing 14 and air is forced through housing 14. Plug 16 is forced to separate from the lower edge 14A of housing 14. The air thereby flows through the openings 12A in bowl 12 and into the bag 42.

When airflow into the bag 42 is interrupted, the air compressed in the bag 42 forces the disk 17 of plug 16 to close against the lower end 14A thereby trapping the pressurized air in the bag 42.

The disk 17 preferably comprises a semiflexible disk laminated to a (soft) pliant disk to ensure leak free seating of the disk 17 on the end of the housing 14.

In order to provide a more dependable seal to prevent gas from escaping and to protect the plug from being inadvertently depressed during transit, the operator forces cap 40 into the top end of the housing 14.

In order to permit small quantities of gas to escape from the bag, the. cap 18 is separated from the open end of housing 14 and the operator presses on the stem 36 with his finger 37 (as shown in FIG. 1.) When it is required to empty the bag quickly, the operator unscrews the housing 14 from the bowl 12.

Figure 3:
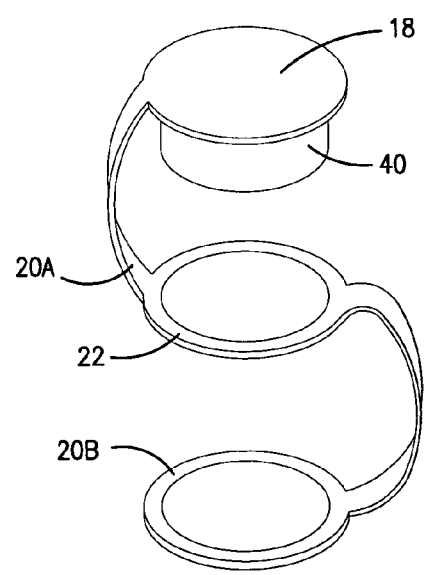
FIG. 3 is a tether that ties all parts of the valve together.

FIG. 3 shows a tether 20 having one end 20A integrally formed to the edge of cap 16. The tether 20 has one loop 20 A that captures the housing 14 and another loop 20b that captures the bowl. The tether 20 is shown in phantom in FIG. 2.

There has been described a valve for a bag to be filled with compressed air such as a dunnage bag. The valve has important advantages compared to valves of the prior art.

One advantage is that the valve offers double protection against leakage—one protection being a spring loaded plug that closes off one end of housing leading into the bag and the other protection being the cap that is pressed into the outer opening of the housing. A second advantage is that the cap provides protection against inadvertently depressing the plug. A third advantage is that the housing and plug sections are removable for reuse on other bags. While the use of the valve on dunngage bags is an important application, it will be understood that the principle based on combining a spring loaded plug with a cap has uses in other areas as well such as sleeping bags, etc.

Variations and modifications of this invention particularly for use in other applications suggested by reading the specification and studying the drawings may be within the scope of the invention.

For example, a preferred method of manufacturing the valve is by injection molding techniques—particularly injection molding the bowl section 14. The material of choice is polyethylene which can then be heat sealed to the polyethylene liner of a bag having a polyethylene liner. However the design principles are clearly applicable to valves for other purposes where polyethylene is not the material of choice. Other materials include other thermosetting or thermal plastics.

Figure 4:
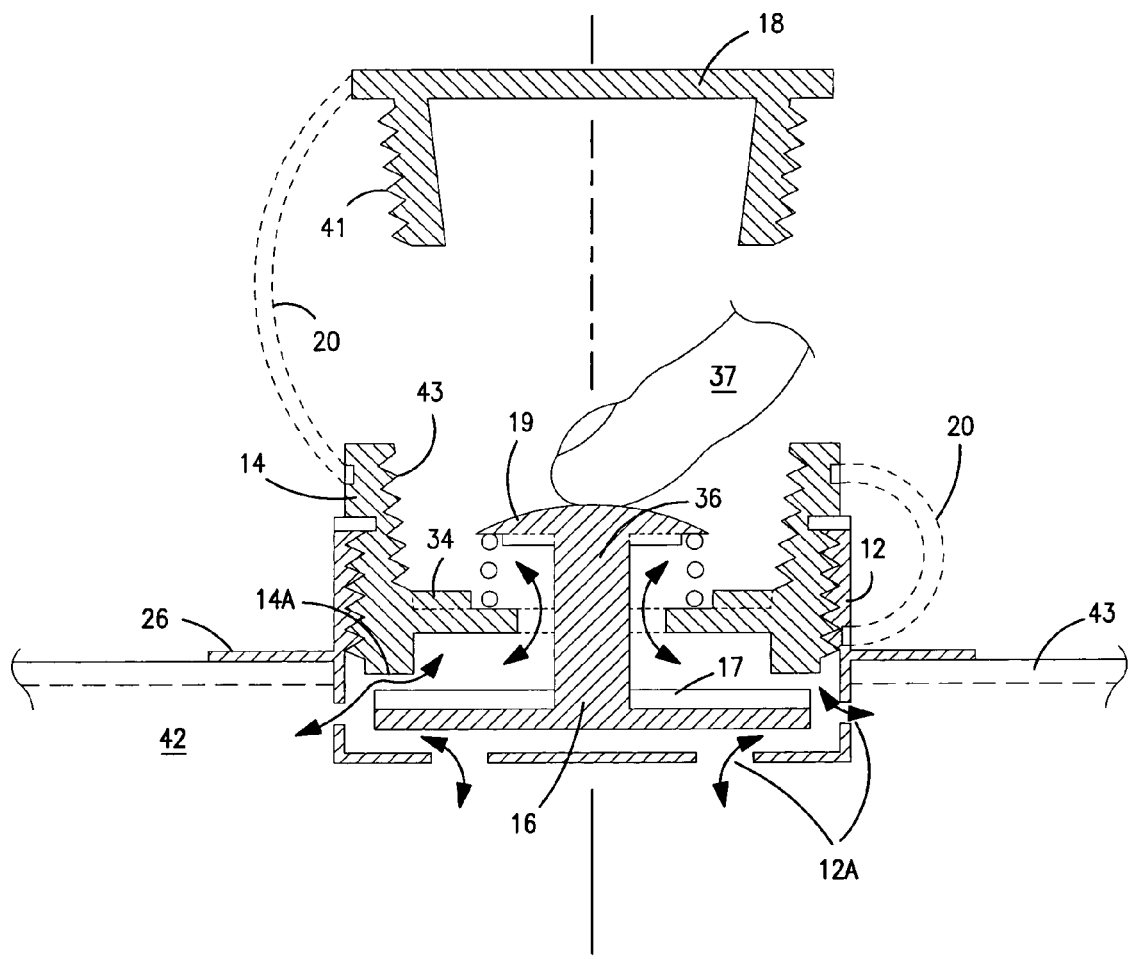
FIG. 4 shows mating threads on the cap and housing.

As another version of the invention, FIG. 4 shows cap 18 with thread 41 and housing 14 with thread so that the cap may be screwed onto the housing instead of press fitted.

It is therefore wished to define the scope of the invention by the appended claims.

What is claimed is:

1. A valve for a container which comprises:
   a bowl having perforations in said bowl and a thread on an inside surface around a rim of said bowl;
   a flange extending outwardly from said rim and arranged for sealing to an outer surface of said container with said bowl extending through an opening into an interior region of said container, providing that compressed air in said container can escape only through said perforations in said bowl;
   a cylindrical housing having a thread on an outer surface at one end of said housing;
   a plug including a disk with a stem extending vertically away from a center of said disk; and a stop on an end of said stem opposite said disk;
   a spider having a central aperture arranged with distal ends of said spider attached to an inside surface of said housing with said stem slideably positioned in said central aperture;
   a compression spring mounted on said stem;
   said housing, spider, spring and plug operably arranged and dimensioned to provide that, in one position, said disk is biased by said spring and pressurized gas in said container to cover said one end of said housing and prevent said pressurized gas from escaping from said container through said housing and in another position, said disk is displaced from said one end of said housing permitting compressed air to escape through said openings in said bowl and through a passage between said disk and said one end of said housing;
   a cap configured to provide that, when said cap is mounted on an opposite end of said housing, compressed air is prevented from escaping from inside said housing to outside said container and when said cap is separated from said opposite end of said housing, air in said housing is enabled to escape from out of said opposite end of said housing to outside said container;
   a tether having one end integrally joined to said cap;
   one loop joined to another end of said tether and dimensioned to fit securely around said rim of said bowl;
   another loop formed as a part of said tether between said cap and said one loop and dimensioned to securely fit around said housing;
   said tether providing that all parts of said valve are fastened together.

2. The valve of claim 1 wherein said cap is removably press fit onto another end of said housing.

3. The valve of claim 1 wherein said container and flange are polyethylene and said flange is joined to said container by heat welding.

4. The valve of claim 3 wherein said bowl and flange are integrally joined.

5. The valve of claim 1 wherein said cap has a thread and another end of said housing has a thread arranged to permit screwing said cap onto said another end of said housing.

6. The valve of claim 5 wherein said disk comprises a semiflexible disk laminated to soft disk providing arranged to provide that said soft disk interfaces between said semiflexible disk and said one end of said housing rendering more leak proof said disk abutting said one end of said housing.

7. The valve of claim 6 wherein said bowl with flange, cap with tether, housing with spider and plug are all injection molded.

\* \* \* \* \*